Feb. 9, 1960  A. W. KNUDSEN  2,924,235
QUICK ACTING VALVE
Filed Feb. 25, 1957  2 Sheets-Sheet 1

INVENTOR.
ARTHUR W. KNUDSEN
BY
Wade Koontz
Frank C. Leach Jr
ATTORNEYS

United States Patent Office 2,924,235
Patented Feb. 9, 1960

2,924,235

QUICK ACTING VALVE

Arthur W. Knudsen, Los Altos, Calif., assignor to the United States of America as represented by the Secretary of the Air Force Application February 25, 1957, Serial No. 642,323

4 Claims. (Cl. 137—461)

This invention relates to a quick acting valve and, more particularly, to a valve that rapidly closes a vacuum evacuated passage when there is a reduction in the vacuum due to a pressure increase therein.

In vacuum evacuated passages such as used with a linear accelerator, for example, it is sometimes desirable to connect the passage with an evacuated experimental set up whose structure may have fragile windows, for example, that may unexpectedly break. If a window should break, a sudden inrush of air into the passage and the accelerator results to cause considerable damage to diffusion pumps, ion gauges, and other connected equipment of the accelerator.

Since it is desired to connect the accelerator with experimental structure and to protect the equipment of the accelerator from damage due to an inrush of air, it is necessary to employ a valve that closes a vacuum evacuated passage rapidly whenever there is a sudden pressure increase. The present invention satisfactorily solves this problem by closing a vacuum evacuated passage in such a period of time, less than .01 second after the start of an inrush of air, that the equipment of the accelerator, which is connected to the vacuum evacuated passage, such as the oil in the diffusion pumps as well as the filaments in the ion gauges, are safe from damage.

An object of this invention is to provide a quick acting valve that rapidly closes a vacuum evacuated passage when there is a possibility of entry of atmospheric air into the passage.

Other objects of this invention will be readily perceived from the following description.

This invention relates to a valve including a casing having a passage extending therethrough. A movable member stops flow through the passage but is held in an open position by suitable means. Other suitable means, which is responsive to a pressure increase in the passage, moves the retaining means whereby the member is released and moves to its closed position.

Figure 1:
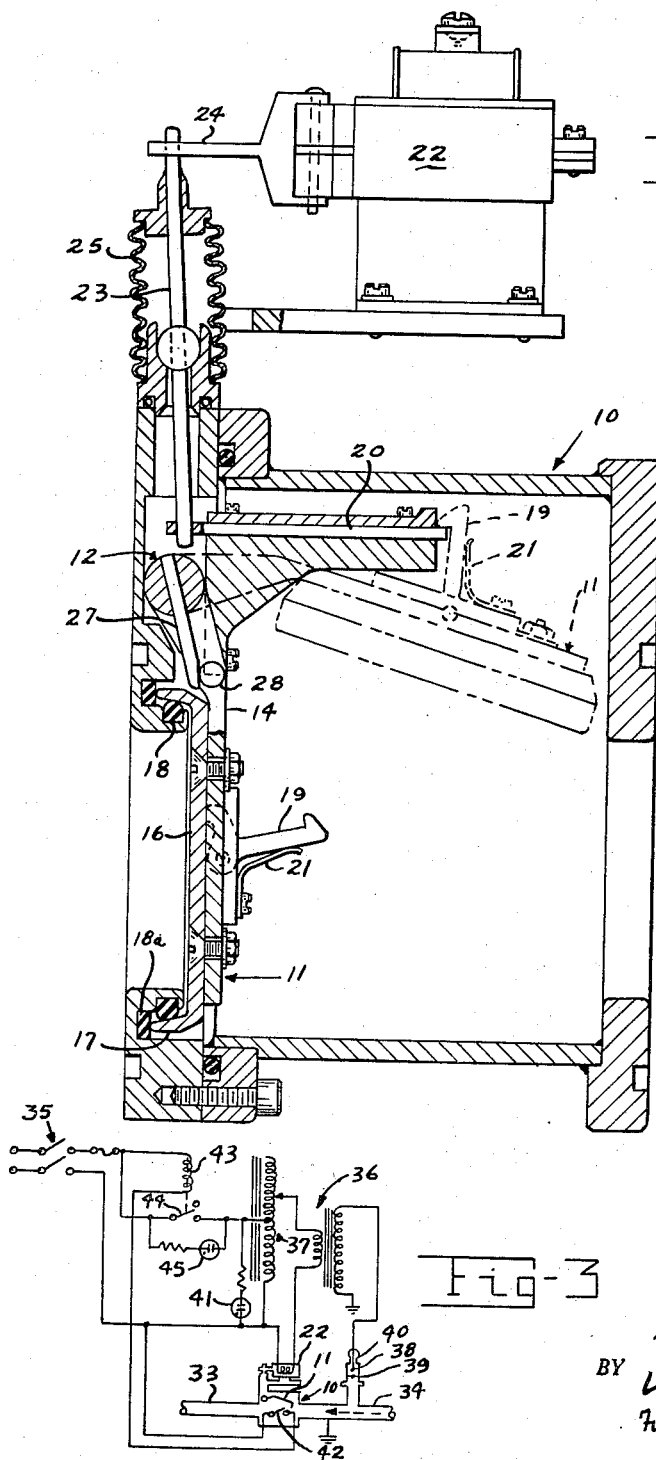
Figure 2:
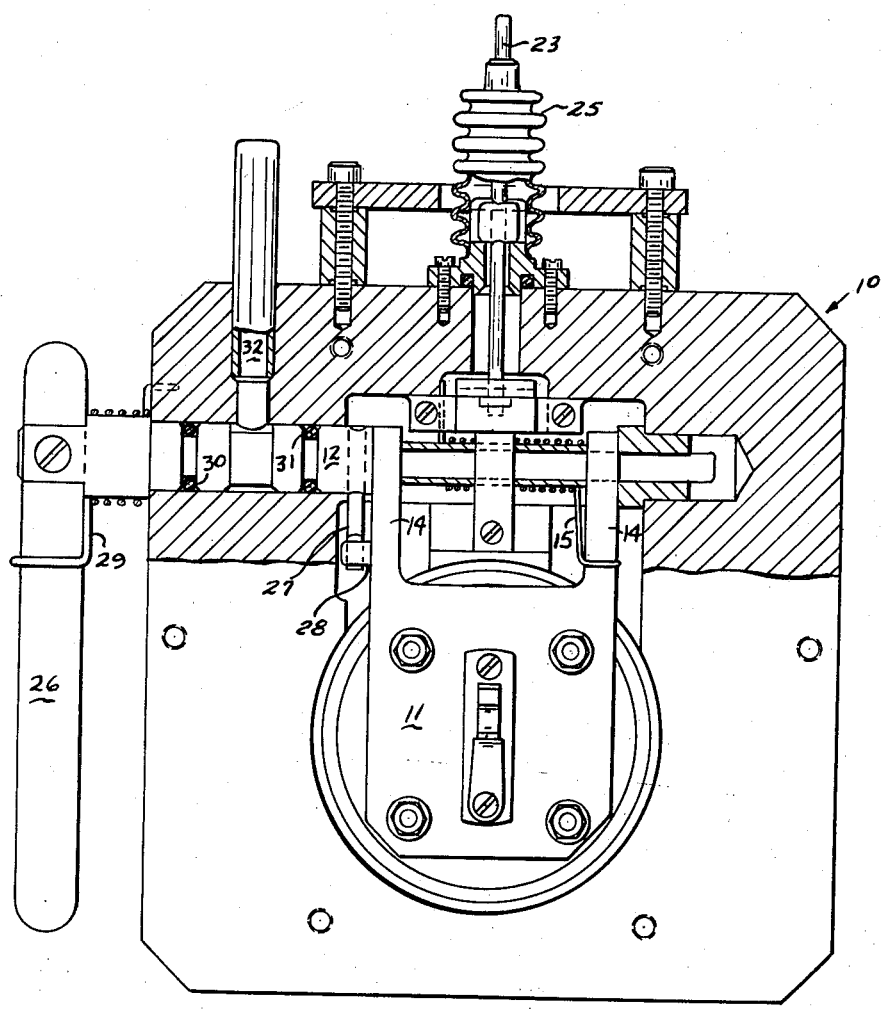

The attached drawings illustrate a preferred embodiment of the invention, in which Fig. 1 is a sectional view of the valve of the present invention in both its open and closed positions;

Fig. 2 is a sectional view partly in elevation of the apparatus of Fig. 1 with the valve in its closed position; and Fig. 3 is a schematic wiring diagram employed with the valve of the present invention.

Referring to the drawings and particularly to Fig. 1, there is shown a valve casing or housing 10 having a passage extending therethrough. A movable member 11 is pivotally mounted on a shaft 12 in the housing 10 by a pair of arms 14. A spring 15 (Fig. 2) is coiled about the shaft 12 and has a portion acting against one of the arms 14 to urge the movable member 11 to its closed position (solid portion in Fig. 1).

The movable member 11 includes a cap-like closure portion 16 having a depending portion 17 adapted to engage or contact an O ring 18, which is mounted in the housing 10 adjacent the passage extending therethrough. The closing of the movable member 11 is cushioned by a washer 18a, which is made of a resilient material. Thus, the movable member 11 engages the O ring 18 to seal the passage extending through the housing when desired.

The movable member 11 also includes a catch member 19, which is engaged by a retaining member 20 in the housing 10 to hold the movable member 11 in an open position. The catch member 19 is held in an engageable position with the retaining member or detent 20 by a leaf spring 21. The retaining member 20 holds the movable member 11 in its open position until the retaining member 20 is moved by a solenoid 22. The solenoid 22 is connected to the retaining member 20 by a pivotally connecting lever 23. The lever 23 is connected at one end to an arm 24 of the solenoid 22 and to the retaining member 20 at its other end. The lever 23 is mounted within a flexible metallic bellows 25, which is secured to the housing 10. The metallic bellows 25 permits movement of the lever 23 by the solenoid 22 while the interior of the housing 10 is maintained at a vacuum. Thus, whenever the solenoid 22 is energized, the retaining member 20 is moved through the lever 23 and the arm 24 to release the catch 19 whereby the movable member 11 rapidly moves to its closed position to stop flow through the passage.

The member 11 is moved to its open position by rotation of the shaft 12 through a handle 26, which is secured to the shaft 12. The shaft 12 has a lifting finger 27 secured thereto and engageable with a lug 28 on one of the arms 14. As seen in Fig. 1, rotation of the lifting finger 27 in a counterclockwise direction moves the member 11 to its open position (phantom portion). A coil spring 29 is disposed about the portion of the shaft 12 extending outside of the casing 10 and engages the handle 26 to return the handle 26 and the lifting finger 27 to the position shown in Fig. 1 after the member 11 has been moved to its open position. This permits faster closing of the movable member 11 since these parts do not take part in the closing motion of the member 11.

In order to maintain the interior of the housing or casing 10 under a vacuum, it is necessary to seal the shaft 12. A pair of O rings 30 and 31 are disposed about the shaft 12 adjacent the portion that extends outside of the housing 10 to seal the shaft. A conduit 32 communicates with an annular passage surrounding the shaft between the O rings 30 and 31 to serve as a pumpout to provide a vacuum seal of the guarded type between the O rings 30 and 31, if desired. It will be understood that the conduit 32 would be omitted if a vacuum seal of the guarded type is not desired between the O rings 30 and 31.

Referring to Fig. 3, there is shown a schematic wiring diagram for use with the movable member 11 within the casing or housing 10, which is shown having a pair of conduits 33 and 34 connected to opposite ends thereof. When used with a linear accelerator, the conduit 33 is connected to the linear accelerator while the conduit 34 is connected to the experimental structure. Whenever the vacuum is reduced within the passage extending through the housing 10 due to a pressure increase resulting from air entering through the conduit 34, the solenoid 22 is energized.

The solenoid 22 is disposed in an electrical circuit having alternating current supplied thereto whenever the switch 35 is closed. The solenoid 22 is connected in series with the primary of a high voltage transformer 36 and the voltage is supplied from a variable transformer 37. The secondary of the transformer 36 is connected to a sphere 38, which cooperates with a sphere 39 to form a spark gap exposed to the conditions within the passage extending through the housing 10. The sphere 39 is connected to ground and is adjustable to vary the gap spacing between the spheres 38 and 39. As long as a good vacuum exists within the passage, the spark gap holds off the high voltage but it breaks down as soon as the pressure exceeds a predetermined pressure.

When the vacuum in the passage is satisfactory, the spark gap does not break down and the transformer 36 operates under essentially no-load conditions. The primary current is, therefore, low and only a small amount of current flows through the solenoid 22. When the vacuum is reduced within the passage due to pressure increase therein, the spark gap quickly breaks down and large currents flow in both the secondary and primary of the transformer 36. This increased current within the primary of the transformer 36 also creates an increased current in the solenoid 22 whereby the solenoid closes and moves the member 11 to its closed position through the movement of the retaining member 20 to release the member 11. The spacing between the spheres 38 and 39 determines the exact pressure at which the spark gap breaks down and the solenoid is energized to release the member 11 so that it may be moved to its closed position by the spring 15.

It is preferable to locate the spark gap out of the way of a possible air blast, such as at the end of a "dead end" tube 40. It is only necessary that the spark gap be responsive to the pressure within the passage in the housing 10.

If desired, signal lights may be employed in the circuit to indicate when the movable member 11 is in an open or closed position. A light 41 is connected in parallel with the variable transformer 37 and when the voltage across the variable transformer 37 is large, the light 41 is energized to indicate that the movable member 11 is in its open position since the large voltage exists when the solenoid 22 is not energized. When the movable member 11 moves to its closed position, a switch 42 is closed whereby a coil 43 of a relay is energized to open a switch 44 so that a lamp 45 is energized. The opening of the switch 44 also turns off the current to the transformer 37 with the exception of that small amount which flows through the lamp 45.

Considering the operation of the present invention, the movable member 11 is rotated from its closed position to an open position by rotation of the shaft 12 through turning of the handle 26. The rotation of the shaft 12 in a counterclockwise direction, as seen in Fig. 1, results in the lifting finger 27 acting against the lug 28 to move the member 11 to its open position where it is held by the retaining member 20 engaging the catch 19.

Whenever the vacuum existing within the passage in the casing 10 is reduced due to an increase in pressure so that the spark gap breaks down, the solenoid 22 is energized. This moves the retaining member 20 to release the catch 19 so that the member 11 is moved rapidly to its closed position by the spring 15. The member 11 seals the passage by engagement of the depending portion 17 with the O ring 18.

It will be understood that an auxiliary pressure actuated switch could also be employed to energize the solenoid 22 to release the member 11 when the spark gap system fails to function, if desired. This switch could be set to operate whenever the pressure rise exceeded a predetermined value. It also should be noted that relation of the spheres 38 and 39 of the spark gap may be adjusted to vary the pressure at which the solenoid 22 is energized. A particular advantage of this invention is that it protects experimental apparatus connected to a vacuum evacuated passage from damage.

For purposes of exemplification, a particular embodiment of the invention has been shown and described according to the best present understanding thereof. However, it will be understood that changes and modifications in the arrangement and construction of the parts thereof may be resorted to without departing from the true spirit and scope of the invention.

I claim:

1. In a protective system, means forming a vacuum evacuated passage, a valve member normally releasably retained in a first, passage open position and biased towards a second, passage closing position, pressure responsive means operable to release said valve member to said second, passage closed position comprising a solenoid and a solenoid-actuated retaining member interconnected with said solenoid normally holding said valve member in said first position, an electrical circuit connected to said solenoid and including a high voltage transformer having a primary connected in series with said solenoid and a secondary having one lead connected to ground, a variable transformer supplying voltage at increasing amounts to said high voltage transformer, a first sphere connected to the other lead of the secondary of said high voltage transformer, a second sphere connected to ground and adjustably mounted relative and adjacent to said first sphere to form an adjustable spark gap operative to prevent spark jump therebetween below a predetermined maximum pressure in said passage, said solenoid being energized to release said valve member on any increase of pressure in the spark gap above the predetermined maximum pressure.

2. In a protective system, means forming a vacuum evacuated passage including a valve normally retained in a passage-open position biased towards a passage-closing position, means to retain the valve in said open position comprising a hook member pivotally mounted on said valve and resiliently held in latched position and a relatively elongated retaining member mounted adjacent to and in latching engagement with said hook member, and means automatically releasing said relatively elongated retaining member from engagement with said hook member comprising a solenoid, a high voltage transformer having a primary connected with said solenoid and a secondary having one lead connected to ground, a variable transformer supplying voltage to said high voltage transformer and a pair of electrode means forming a spark gap therebetween in the passage, one of said electrode means connected to ground and adjustably mounted relative to the other electrode means to form an adjustable spark gap operative to prevent spark jump therebetween below a predetermined maximum pressure in said passage and the other of said electrode means connected to the other lead of the secondary of said high voltage transformer to energize said solenoid by spark jump therebetween in said passage on any increase in pressure therein above the predetermined maximum pressure and a pivotally mounted interconnecting lever between said solenoid and said retaining means to release said retaining means and the hook member interconnected therewith.

3. In a protective system, means forming a vacuum evacuated passage including a valve normally latched in open position and biased towards a passage-closing position, pressure responsive means automatically operable to release said valve from its normally latched position to said passage-closing position including a solenoid and two electrodes forming a spark gap therebetween communicating with said passage responsive to a pressure increase to form a spark jump therein in said passage above a predetermined maximum pressure, an electrical circuit connected to said electrodes including a first transformer in circuit with one of said electrodes having a primary connected to said solenoid and a secondary having one lead connected to ground and a second transformer supplying high voltage thereto to supply a relatively large current flow therethrough on breakdown of said spark gap by an increase of pressure in said passage above the predetermined maximum pressure, said electrodes consisting of two spheres, at least one of said spheres being adjustable to vary the distance therebetween to vary the pressure increase at which the spark gap energizes the electrical circuit, one of said spheres connected to ground and the other of said spheres connected to the other lead of the secondary of said first transformer, and a solenoid connected in series with the primary of said first transformer and interconnecting means between said valve and said solenoid, said last-named means being operable to release the valve from its normally latched position upon energization of said solenoid by said first transformer.

4. In a protective system, means forming a vacuum evacuated passage including a valve normally retained in a passage-open position and biased towards a passage-closing position, solenoid-actuated means to retain the valve in an open position and operable to release said valve to said passage-closing position including a solenoid, interconnecting linkage between said solenoid and the valve, an electrical circuit having a high voltage transformer having a primary connected in series with said solenoid and a secondary having one lead connected to ground, a pair of spheres forming a spark gap in communication with said passage with at least one of said spheres being in circuit with the other lead of the secondary of said high voltage transformer and the other of said spheres connected to ground, the spark gap breaking down in response to a vacuum reduction in the passage to supply a large flow of current to said solenoid to move said solenoid-actuator retaining means to release the valve, at least one of said spheres being adjustable to vary the distance therebetween to vary the vacuum reduction at which the spark gap breaks down to prevent spark jump therebetween below a predetermined maximum pressure.

References Cited in the file of this patent

UNITED STATES PATENTS

| | | |
|---|---|---|
| 1,503,329 | Mitchell | July 29, 1924 |
| 1,607,343 | Davenport | Nov. 16, 1926 |
| 1,620,876 | Currivan | Mar. 15, 1927 |
| 2,067,622 | Smith | Jan. 12, 1937 |
| 2,630,818 | McRae | Mar. 10, 1953 |
| 2,658,521 | Lyon | Nov. 10, 1953 |
| 2,763,816 | Baker | Sept. 18, 1956 |